Feb. 22, 1966   H. J. HANSEN   3,236,251
VALVE UNIT

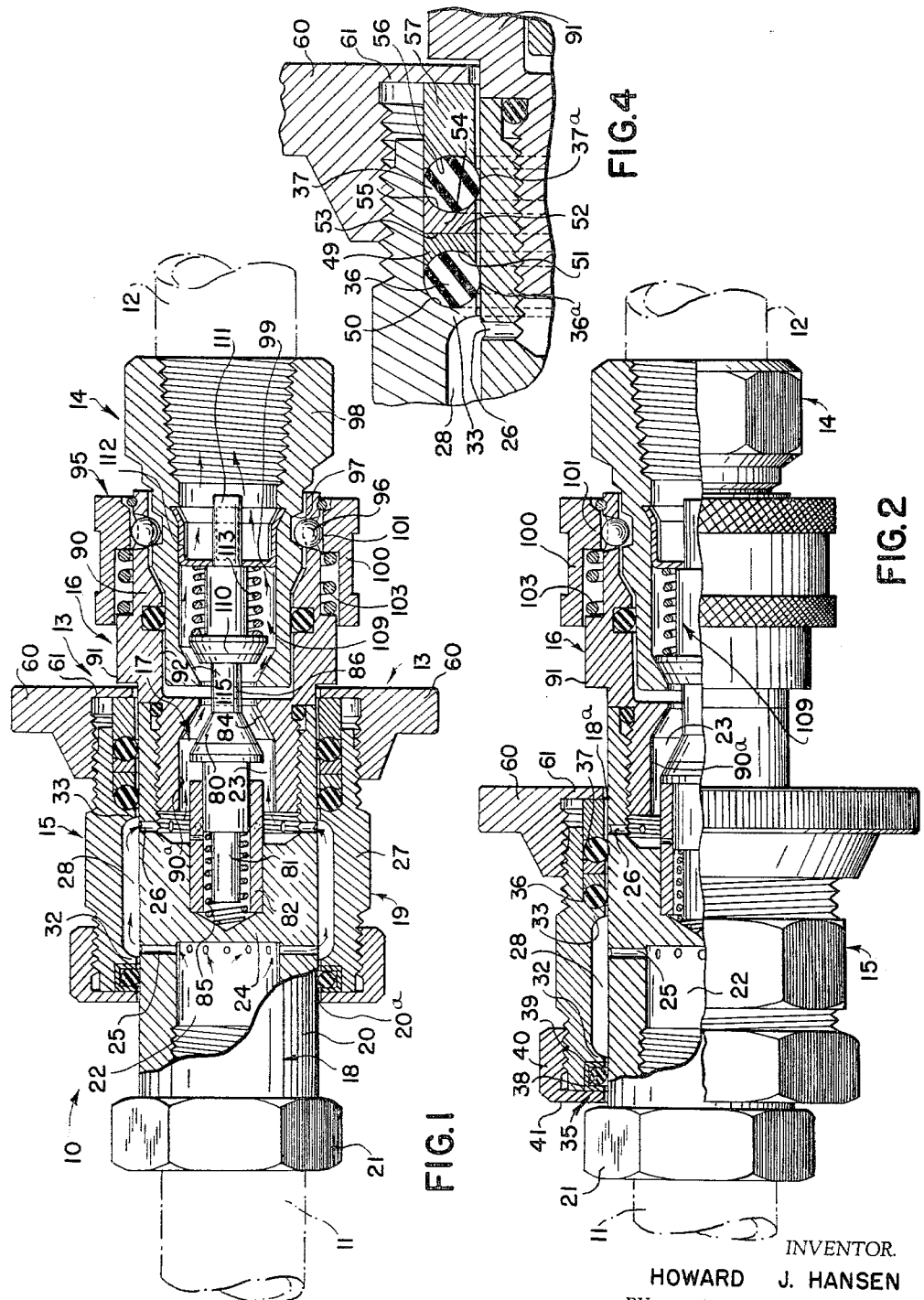

Filed April 4, 1963   2 Sheets-Sheet 2

INVENTOR.
HOWARD J. HANSEN
BY *Williams, David,*
*Hoffmann & Yount*
ATTORNEYS

United States Patent Office 3,236,251
Patented Feb. 22, 1966

3,236,251
VALVE UNIT
Howard J. Hansen, Bay Village, Ohio, assignor to The Hansen Manufacturing Company, Cleveland, Ohio, a corporation of Ohio
Filed Apr. 4, 1963, Ser. No. 270,571
18 Claims. (Cl. 137—614.05)

The present invention relates to a valve mechanism and, particularly, to a fluid coupling and slide valve mechanism for connecting fluid conduits and including a socket part adapted to be connected to one fluid conduit, a plug part adapted to be connected to another fluid conduit and to the socket part, and valve means for blocking the flow of fluid between the conduits when the parts are disconnected and providing for fluid flow when the parts are connected.

Known prior art fluid couplings and slide valve mechanisms for use in high pressure fluid lines have certain disadvantages. In slide valve mechanisms which include sealing members problems of the sealing members being extruded or "blown out" are common when the slide valve is used in high pressure lines. Known prior art fluid couplings for connecting high pressure conduits have been difficult to manually connect and disconnect. Disconnection thereof is difficult because of the pressures in the coupling which resist forces tending to disconnect the coupling, and in some situations make it physically impossible to manually disconnect the prior art couplings. Connection thereof is difficult due to the high pressures which must be overcome to connect the coupling parts and open the valve means therein.

Accordingly, the principal object of the present invention is the provision of a new and improved slide valve mechanism which is extremely reliable and durable when used in high pressure fluid lines and wherein extrusion and "blowing out" of movable sealing members forming a part of the slide valve is minimized.

A further object of the present invention is the provision of a new and improved slide valve mechanism including movable sealing means positioned to prevent fluid leakage between the valve body and sleeve members and wherein the sealing means is in the form of ring means "captured" between support members having surfaces substantially corresponding with the peripheral surface of the ring means to receive and securely hold the ring means in position in the sleeve member.

Another principal object of the present invention is the provision of a new and improved fluid coupling for connecting high pressure conduits and which may be readily and easily manually connected and disconnected by applying a minimum of force.

A further object of the present invention is the provision of a new and improved fluid coupling wherein an upstream coupling part includes a slide valve mechanism that may be closed to shut off the coupling from the fluid pressure supply to facilitate the separation of the coupling.

A further object of the present invention is the provision of a new and improved fluid coupling wherein the slide valve mechanism functions to vent its outlet chamber after blocking the flow of fluid to the coupling parts in order to reduce the pressure in the coupling to facilitate the separation of the coupling.

A still further object of the present invention is the provision of a new and improved fluid coupling for connecting a supply conduit to an outlet conduit and including a slide valve mechanism which has a sleeve member movable to a venting position and so constructed as to vent the fluid outlet chamber and direct the vented fluid toward the fluid inlet end of the slide valve mechanism.

Another object of the present invention is the provision of a new and improved fluid coupling wherein the coupling part connected to the outlet conduit includes a first self-closing valve which closes when the parts are disconnected and also closes when the sleeve member is moved to its venting position so that the outlet conduit is not completely vented along with the outlet chamber of the slide valve.

A further object of the present invention is the provision of a new and improved valve and coupling mechanism wherein the upstream part of the coupling includes slide valve mechanism for shutting off pressure from the coupling and a self-closing valve which is biased to a closed position and is closed when the coupling is separated to prevent the flow of fluid through the one part in the event the slide valve is opened when the socket and plug parts are disconnected.

Another object of the present invention is the provision of a new and improved fluid coupling including socket and plug parts having first and second self-closing valves which are biased closed and engage when the socket and plug parts are connected and wherein the downstream valve is biased by a stronger spring than the other valve and causes the other valve to open while the downstream valve remains closed and wherein the downstream valve is opened by the application of the fluid force thereagainst when a slide valve associated with the upstream part of the coupling is open.

Another principal object of the present invention is to provide a valve mechanism, as noted above, which is simple and compact in construction and extremely durable and reliable in operation.

A further and more specific object of the present invention is the provision of a simple and compact new and improved valve mechanism including a slide valve and self-closing valve unit wherein the self-closing valve includes a spring means biasing a valve head to a closed position and wherein the spring means engages a part of the slide valve.

A further object of the present invention is the provision of a new and improved valve mechanism including a socket part, a plug part received in the socket part, and valve means located in the socket and plug parts which are biased toward each other and to a closed position by separate spring means, the spring means biasing the valve means located downstream being stiffer than the other spring means, and wherein the valve means biased by the stiffer spring means engages the other valve means and forces it to open when the parts are connected, and the fluid force acting on the downstream valve means against the bias of said stiffer spring means opens the downstream valve means.

Further objects and advantages of the present invention will be apparent to those skilled in the art from the following description of a preferred embodiment of the present invention made with reference to the accompanying drawings forming a part of the specification, in which:

FIG. 1 is a longitudinal sectional view of a fluid coupling embodying the present invention and showing the valve parts thereof in their open positions with fluid flowing therethrough;

FIG. 2 is a longitudinal sectional view partly in elevation of the fluid coupling shown in FIG. 1 illustrating the coupling with certain parts thereof in their closed positions;

FIG. 4 is an enlarged partial sectional view of a portion of the coupling illustrated in FIG. 1;

Figures 3, 5, 6:
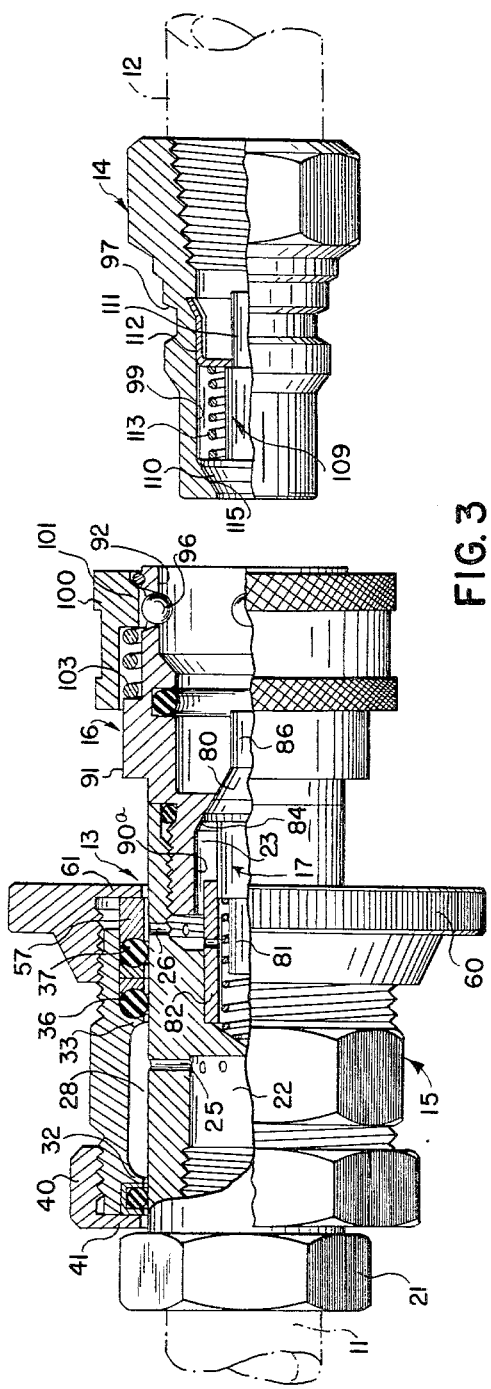
FIG. 3 is a longitudinal sectional view partly in elevation of the fluid coupling shown in FIG. 1 with certain parts thereof disconnected.
FIG. 5 is a longitudinal sectional view partly in elevation of a modified fluid coupling.
FIG. 6 is an end elevational view of the coupling illustrated in FIG. 5 looking thereat from the left.

The present invention is illustrated in the drawings as embodied in a slide valve double shut-off quick-disconnect combination or fluid coupling mechanism 10 for use in high pressure fluid lines, and specifically for connecting a high pressure fluid supply conduit 11 to a high pressure fluid outlet conduit 12. The coupling mechanism 10 includes a socket part 13 adapted to be connected to supply conduit 11 and a plug part 14 adapted to be connected to the outlet conduit 12. The plug part 14 is adapted to be received in the socket part 13 to connect the conduits, and be released therefrom to disconnect the conduits, as well be apparent from the description below. While the fluid coupling mechanism 10 is especially adapted for use in high pressure fluid systems, and particularly air systems, it will be apparent that many features of the present invention are applicable to fluid couplings in general and may be used in systems other than high pressure air systems.

In accordance with the present invention, the socket part 13 of the coupling mechanism 10 includes a slide valve mechanism 15, a plug receiving body portion 16 associated with the slide valve mechanism 15, and a self-closing valve unit 17 to be described in detail hereinbelow. The slide valve mechanism 15 includes a slide valve body 18 and a sleeve member 19 which is positioned encircling the valve body 18 and is slidable along the outer periphery 20 of the valve body 18. The valve body 18 is preferably highly polished and free of nicks and depressions. The clearance 20a between the sleeve member and surface 20 of the body 18 is extremely small and is shown in the drawings as slightly exaggerated. The left end of the valve body 18, as shown in FIG. 1, has a wrench receiving nut portion 21 adapted to be engaged by a wrench for connecting the body portion 18 to the conduit 11.

The body 18 includes a fluid supply chamber 22 into which the conduit 11 opens and into which fluid is directed by the conduit 11. The body 18 also has an outlet chamber 23 which is separated from the inlet chamber by a partition member 24 located generally centrally of the valve body 18. A plurality of fluid passageways 25 extend through the peripheral surfaces of the body 18 and connect the fluid inlet chamber 22 with the outer periphery of the body 18. A similar set of openings 26 connect the outlet chamber 23 of the valve body 18 with the outer periphery of the valve body.

The sleeve member 19 is slidable on the outer periphery 20 of the valve body 18, as noted above, and has open and closed positions, illustrated in FIGS. 1 and 2, respectively. The sleeve member 19 includes a sleeve body 27 having a fluid conducting annular groove 28 on the inner surface or surface adjacent the outer peripheral surface 20 of the body 18. The groove 28 is defined by spaced annular ledges or projections 32, 33 which extend inwardly from the inner surface of the sleeve body 27. The groove 28 is of a sufficient width to connect the passageways 25 with the passageways 26 and provide a passage for the flow of fluid from the inlet chamber 22 into the outlet chamber 23 when the sleeve is positioned in its open position relative to the body 18, as shown in FIG. 1. When the sleeve 19 is positioned in its closed position the flow of fluid between the inlet and outlet chambers 22, 23, respectively, is blocked since the groove 28 when the sleeve 19 is in its closed position does not communicate with the opening 26 leading to chamber 23. Moreover, when the sleeve 19 is in its closed position, the chamber 23 is vented, that is communicated with the atmosphere as will be described hereinbelow.

In order to block the flow of fluid from chamber 22 to chamber 23 when the sleeve is in its closed position and also to prevent fluid from leaking between the body 18 and sleeve 19 when the sleeve is in its open position, the sleeve member 19 includes a plurality of axially spaced sealing ring means 35, 36, and 37. These sealing ring means provide spaced seals between the outer periphery 20 of the valve body and the sleeve member 19 so that fluid will not leak therebetween. The sealing ring means 35 is positioned to the left of the groove 28, as viewed in FIG. 1, and provides a seal preventing leakage to the left. The sealing ring means 36, 37 are located to the right of the groove 28, as viewed in FIG. 1, and provide a seal preventing leakage between the body and sleeve to the right, and when the sleeve is in a closed position the sealing ring means 36, 37 are located engaging the portion of surface 20 intermediate openings 25, 26 and block the flow of fluid between the openings.

The sealing ring means 35 is positioned axially outwardly of the projection 32 and on the upstream end of the sleeve 19, as noted above, and includes a sealing ring member 38 which is received in a Teflon band member 39 having a U-shaped cross section. The sealing ring means is clamped in position in the sleeve 19 by an end cap member 40 threaded onto the left end of the sleeve body 27 and having an annular ledge 41 engaging one side of the sealing ring means 35 and tightly holding or clamping the sealing ring means 35 against the projection 32.

The sealing ring means 36, 37 are positioned axially outwardly from the projection 33 and on the downstream end of the sleeve 19. Being on the downstream end of the sleeve member, sealing ring means 36, 37 provide a seal between the sleeve and body member 18 which must withstand the full force of the high pressure fluid. To this end the sealing ring means 36, 37, which are preferably in the form of conventional rings having a circular cross section, are "captured" in the sleeve member. This "capturing" of the rings in the sleeve member permits the valve to be used in extremely high pressure lines and provides reasonably durable sealing rings that are not readily worn or extruded into the openings 26 by the extremely high fluid pressure when they pass over the openings 26 and since the body of the slide valve is preferably highly polished the sealing rings have a reasonably long life.

The sealing rings 36, 37 are captured between concave surfaces formed on adjacent portions or members forming parts of the sleeve member 19 so as to provide a substantial area of tight surface contact between these portions and the outer periphery of the sealing rings. The sealing ring 36 is captured between the projection 33 and a band member 49 preferably made of metal such as steel. Opposite outer surface portions of the sealing ring 36 engage respectively a concave surface 50 on the projection 33 opposite the surface thereof defining the groove 28, and a concave surface 51 formed on the annular steel band member 49. A surface 52 of the steel band member 49 opposite the concave surface 51 is planar, and a planar surface 53 of another steel band member 54 engages the surface 52 of steel band member 49. The steel band member 54 includes a concave surface 55 opposite surface 53 and which engages and receives a peripheral surface portion of the sealing ring 37. Another portion of the periphery of the sealing ring 37 is engaged and received in a concave surface 56 formed in a cylindrical sleeve member 57 which is slidably received in the bore of the sleeve member 19. The steel ring members 49, 54, the sealing rings 36, 37 and the sleeve member 57 are all held in tightly assembled engagement, as described above, by an end cap member 60 which is threaded onto the end of the sleeve body member 27 opposite the end having end cap 40 threaded thereon. The cap member 60 includes a projecting portion 61 which extends inwardly thereof and engages the the outermost axial surface of the sleeve member 57 and clamps the sleeve member 57 in tight engagement with the sealing ring 37 and thus clamps the sealing rings 36, 37 and steel rings 49, 54 in the sleeve member. It should be apparent from the above description that the concave surfaces which engage the opposite surface portions of the sealing rings 36, 37 provide for securely holding the sealing rings in position in the sleeve member, and that each sealing ring 36, 37 has a small surface portion 36a, 37a, respectively, not engaged in concave recesses but engaging the body 18. By supporting the sealing rings as described wear of the sealing rings due to the high pressure tending to extrude them into any openings or nicks in the valve body 18 will be minimized.

As mentioned above, when the sleeve member 19 is in its closed position it provides for venting the chamber 23 to the atmosphere. Accordingly, a suitable clearance is provided between the sleeve member 57 and the outer periphery 20 of the body member 18 and forms a fluid passageway 18a communicating with the openings 26 in the body 18 and the atmosphere surrounding the coupling 10. The passageway 18a is shown of a slightly exaggerated width in the drawings but does provide for venting the fluid in the chamber 23 through the openings 26 and to the atmosphere when the sleeve 19 is in its closed position to reduce the pressure in the chamber 23 for a purpose to be described hereinbelow.

As above mentioned, the socket part 13 of the fluid coupling 10 includes not only the slide valve mechanism, 15, described above, but also a self-closing valve unit 17 and a plug receiving body portion 16. The valve unit 17 is located and supported in the outlet chamber 23 of the slide valve mechanism and preferably includes a valve head 80 formed on the end of a valve stem 81 which extends into a tubular guide 82 suitably secured to and extending substantially perpendicular from the partition portion 24 of the slide valve body 15. The particular structure of the valve head 80 and stem 81 forms no part of the present invention and may be of any conventional construction. The valve head 80 is adapted to engage a valve seat 84 on the plug receiving body member 16 to be described in detail hereinbelow, and when in engagement with the valve seat 84 prevents the flow of fluid therethrough.

A suitable relatively light spring 85 is located in the tubular portion 82 of the valve mechanism 17, one end of which engages the partition portion 24 of the slide valve 15 and the other end of which engages a part on the valve stem 81 of the valve unit 17. The end of the valve head 80 opposite the end connected to the valve stem 81 carries a nose member 86 which projects outwardly from the valve head 80 and valve stem 81, for a purpose to be described hereinbelow. From the above description it should be apparent that the valve unit 17 is closed when the socket and plug parts are disconnected and thus prevents the flow of fluid through socket part 13 in the event that the slide valve portion 15 thereof is accidentally opened when the socket part is disconnected from the plug part 14.

As aforementioned, the plug receiving body member 16 provides the valve seat 84 for the valve unit 17. The plug receiving body member 16 includes a main body portion 90 having a fluid passage 90a therethrough communicating with outlet chamber 23, and a threaded male end thereon which is adapted to be threaded into a female threaded end portion of the slide valve body 18. The valve seat 84 is formed on a portion of the walls defining the fluid passage 90a therethrough. The main body portion 90 includes a projection or shoulder 91 thereon which projects radially from the outer periphery thereof adjacent the slide valve body 18 and which forms an abutment for the sleeve member 19 when the sleeve member is positioned in its open position, as illustrated in FIG. 1. Moreover, the plug receiving body member 16 includes a bore 92 which communicates with passage 90a and which receives the plug part 14 when the coupling parts are connected.

The plug receiving or socket body member 16 also includes a quick-disconnect coupling means 95. The quick-disconnect coupling means 95 is adapted to secure the plug member 14 in the bore 92 and is provided to quickly release the plug member 14 for movement from the bore or socket 92. The quick-disconnect coupling mechanism 95 includes ball detent means 96 supported in openings in the socket body member 90 and which are adapted to be received in recessed portions 97 in the outer periphery of the body member 98 of the plug member 14. A locking sleeve 100 is provided on the outer periphery of the plug body member 16 and has a locking portion 101 adapted to engage and hold the ball detent means 96 in the recessed portions 97 of the plug member 14 and hold the plug member 14 in position in socket 92. A suitable spring 103 biases the locking sleeve member 100 into a locking position. It should be apparent to those skilled in the art that the plug member 14 may be released for movement from the socket body member 16 upon movement of the locking sleeve 100 against the bias of the spring 103, thereby releasing the detent means 96 so as to permit movement of the plug member 14 from the socket 92.

The plug member 14 which is received in the socket 92 to connect conduits 11 and 12, as mentioned hereinabove, includes a body portion 98 having a fluid passageway 99 therethrough. The body portion 98 supports a self-closing valve unit 109 in the passageway 99. The valve unit 109 includes a valve head 110 supported on the end of a valve stem 111. The valve stem 111 is supported in a spider member 112 suitably supported in the fluid passageway 99. A suitable spring 113 is provided biasing the valve head 110 into engagement with a valve seat 115 formed on the inner end of the plug body 98. The spring 113 is a relatively stiff spring as compared with the spring 85 biasing the valve 83 therein into closed position, for a purpose which will be apparent from the description hereinbelow.

With the sleeve member 19 in its closed position, as the plug member 14 is inserted into the socket 92, the valve head 110 engages the nose member 86 of the valve 17 and since the spring 113 is relatively stiff when compared to the spring 85 the valve head 80 is forced away from its seat 84 causing the valve 17 to open. The valve head 110, however, will remain in engagement with its valve seat 115, as shown in FIG. 2. When the sleeve member 16 is moved to its open position providing for the flow of fluid from the inlet chamber 22 to the outlet chamber 23 thereof the fluid in the chamber 23 applies an additional force against the valve head 110, forcing the valve head against the bias of the spring 113, and causing the valve head 110 to move away from the valve seat 115 to the position as illustrated in FIG. 1 and providing for the flow of fluid through the coupling 10.

In the event that the sleeve member is in its open position when the plug and socket patrs are to be connected, high pressure will be resisting movement of the valve head 80 away from the valve seat 84 and makes connecting the plug and socket parts difficult. The sleeve can be moved to its closed and venting position to reduce the pressure resisting movement of valve head 80 and provide for easy connection of the coupling parts.

After the coupling 10 has been connected and fluid is flowing therethrough, as illustrated in FIG. 1, pressures are created in the coupling which provide resistance to any force tending to disconnect the plug and socket parts. To readily disconnect the plug and socket parts with a minimum of force, the slide valve sleeve 19 is moved to its closed position with respect to the valve body 18, as shown in FIG. 2, flow of fluid through the coupling is blocked thereby and fluid in the supply outlet chamber 23 of the valve body 18 is vented to the atmosphere through the openings 26 in the valve body 18 and through passageway 18a provided between the sleeve 57 and the outer periphery 20 of the body member 18. This eliminates the above mentioned pressures resisting disconnection of the coupling and greatly facilitates disconnection.

The fluid vented from the chamber 23 is directed along the outer periphery of the valve body 18 toward the outlet side of the valve body 15, as noted above. As the fluid is vented from the supply chamber 23 the force holding the valve 110 in an open position is decreased and when the pressure no longer can overcome the bias of the spring 115 the valve head 110 closes. Thus, the entire outlet conduit 12 is not vented to the atmosphere. The valve head 80, however, is maintained open and moves backward, that is to the left as viewed in FIG. 1, from the position in FIG. 1 to the position shown in FIG. 2, as the valve head 110 moves to a closed position.

A modified coupling 118 having a different form of sleeve member 119 forming a part on the slide valve portion thereof is illustrated in FIG. 5. Since the structure and operation of the coupling 118 is the same as the structure and operation of the coupling 10, except for the sleeve member 119, the coupling 118 will not be described in detail. Those reference characters used to designate elements of the coupling 10 are used to designate corresponding elements of the coupling 118.

The sleeve member 119 illustrated in FIG. 5 differs from sleeve member 19 and includes an annular sleeve body 120 having projections or baffles 121 extending radially and axially from the periphery thereof and defining passages 122 therebetween. An end cap 123 is secured at one end of the sleeve body to the baffles 121. The end cap 122 includes a portion 124 spaced from the outer end of the sleeve body member and provides an annular passage 125 therebetween intersecting the passages 122 formed by the baffles on the outer periphery of the sleeve body. As illustrated in FIG. 5, when the sleeve member is in its closed position, the openings 26 in the valve body 15 communicate with the opening 125 provided by the projecting portion 124 of the end cap 123, and the fluid in the outlet member 23 is directed from the outlet chamber of the valve body 18 through the openings 26 and through the opening 125 and passageways 122 toward the supply or inlet end of the valve body 18.

The sleeve member 119 also includes O-rings 35, 36, 37 supported in the sleeve body member 120 by projections between which the sleeve members are frictionally held. This structure is, of course, different from the "capturing" of the O-rings as in the sleeve 19. Moreover, the sleeve body member 120 may be provided with bayonet slots, not shown, which are adapted to engage bayonet pins, not shown, on the body 18 of the slide valve to hold the sleeve in its closed position.

The preferred embodiment of the present invention has been described hereinabove in considerable detail. However, certain modifications, changes and adaptations of the structure described herein may be made by those skilled in the art and it is intended to cover hereby all changes, modifications, and adaptations of the present invention which fall within the scope of the appended claims.

Having described my invention, I claim:

1. A valve mechanism adapted to connect a first supply high pressure fluid conduit with a second outlet high pressure fluid conduit comprising, a plug part adapted to be connected to one of the conduits and having a first fluid passage therethrough and a socket part for receiving said plug part for connection thereto and adapted to be connected to the other of said conduits and having a second fluid passage therethrough communicating with said first passage when said parts are connected, one of said parts including a self-closing valve member located in one of said passages and having a closed position when said parts are disconnected and an open position for allowing fluid flow through said passages when said parts are connected, said valve member being acted upon by fluid pressure to urge it to its closed position, means on the other part for moving said valve member to its open position and for maintaining it in its open position against said fluid pressure when said parts are connected, and a slide valve means forming a portion of said one of said parts and adapted to be connected to said supply conduit and having a slide valve member movable independently of said valve member and when said parts are connected between an open position directing fluid flow therethrough to act on said valve to urge it to its closed position and a closed position blocking the flow of fluid therethrough to block the flow of high pressure fluid therethrough acting on said valve.

2. A valve mechanism as defined in claim 1 wherein said slide valve means includes a slide valve body portion having fluid inlet and fluid outlet chambers, a sleeve member movable relative to said slide valve body portion between an open position wherein it communicates said inlet and outlet chambers providing flow therebetween and a closed position blocking the flow of fluid therebetween, and a coupling body portion for the one of the parts adapted to be connected to said supply conduit and connected to said slide valve body portion and adapted to be connected with the other of said parts.

3. A valve mechanism as defined in claim 2 wherein said sleeve member includes sealing ring means providing a fluid tight seal between said members, said sealing ring means having a circular cross section, a first convex peripheral surface portion engaging the periphery of said body member and second diametrically opposite convex surface portions, support means for said sealing ring means having concave surface portions corresponding to said second opposite convex surface portions of said sealing ring means and engaging said second portions and clamping the sealing ring means therebetween to trap the sealing ring means therebetween.

4. A valve mechanism as defined in claim 2 wherein said main body portion is provided with abutment means providing a stop for said sleeve member when moved to its said open position blocking movement thereof beyond its open position.

5. A valve mechanism as defined in claim 2 wherein said sleeve member includes means for venting said outlet chamber to the atmosphere when said sleeve member is in its said closed position.

6. A valve mechanism as defined in claim 1 wherein said self-closing valve supported by the part including said slide valve includes a valve seat, a valve head engageable with said valve seat, and spring means engaging a portion of said slide valve and biasing the valve head into engagement with the valve seat.

7. A valve mechanism as defined in claim 1 wherein said self-closing valve supported by said one part forms a first self-closing valve in the coupling and a second self-closing valve is supported by said other part, each of said self-closing valves including a spring means biasing them to a closed position, the spring biasing said second self-closing valve to a closed position acting against fluid flow and being stiffer than the spring biasing said first self-closing valve, and said self-closing valves including portions engageable upon connection of said parts causing said first self-closing valve to be opened and said second self-closing valve to remain closed until the application of fluid pressure thereagainst opens the second self-closing valve against the bias of said stiffer spring upon opening of said slide valve.

8. A valve mechanism adapted to connect a supply fluid conduit to an outlet fluid conduit comprising, a plug part connected to one of said conduits and having a first fluid passage therethrough and a socket part for receiving said plug part for connection thereto connected to the other of said conduits and having a second fluid passage therethrough, the one of said parts connected to said supply conduit including a slide valve mechanism including a slide valve body member having inlet and outlet chambers, said inlet chamber adapted to be connected with said supply conduit, a sleeve member movable relative to the slide valve body member and having means for communicating said inlet and outlet chambers, a self-closing valve carried by said one part and having an open position permitting fluid flow from said outlet chamber and a closed position blocking the flow of fluid from said outlet chamber, said valve being acted upon by fluid pressure in said outlet chamber of said slide valve to urge it to its closed position, said sleeve member being movable independently of said self-closing valve and when said parts are connected, spring means biasing said valve to its said closed position, cooperating portions on said plug and socket parts for opening said valve when connected and maintaining said valve open, and quick-disconnect means for connecting said parts whereby said slide valve may be moved to a closed position to block the flow of fluid to said outlet chamber when said parts are connected.

9. A valve mechanism as defined in claim 8 wherein said sleeve member includes vent means for venting said outlet chamber when said sleeve member is in its said closed position to reduce the pressure in said outlet chamber.

10. A valve mechanism as defined in claim 8 wherein said self-closing valve supported by said one part forms a first self-closing valve in the coupling and a second self-closing valve is supported by said other part, each of said self-closing valves including a spring means biasing their associated valves to a closed position, the spring biasing said second self-closing valve to a closed position acting against fluid flow and being stiffer than the spring biasing said first self-closing valve, and said self-closing valves including portions engageable upon connection of said parts causing said first self-closing valve to be opened and said second self-closing valve to remain closed until the application of fluid pressure thereagainst opens the second self-closing valve against the bias of said stiffer spring upon opening of said slide valve.

11. A valve mechanism as defined in claim 8 wherein said sleeve member is provided with sealing ring means having a first surface portion engaging the outer periphery of the slide valve body providing a seal therebetween to prevent the leakage of fluid between the sleeve and the slide valve body and second opposite convex surface portions, and support means for said sealing ring means having concave surface portions corresponding to said second convex surface portions of said sealing ring means and adapted to engage said second convex surface portions and clamp the sealing ring means in engagement with the concave surface portions thereby trapping the sealing ring means in the sleeve member.

12. A valve mechanism for connecting supply and outlet fluid conduits comprising, a plug part adapted to be connected to one of said conduits and having a first fluid passage therethrough, a socket part adapted to be connected to the other of said conduits and to receive said plug part and having a second fluid passage therethrough, a first self-closing valve means in the passage in the part connected to said supply conduit and having a closed position blocking the flow of fluid therethrough and an open position permitting fluid flow therethrough, first spring means biasing said first valve means in the direction of fluid flow to its closed position, a second self-closing valve means in the passage in the part connected to said outlet conduit and having a closed position blocking the flow of fluid therethrough and an open position permitting fluid flow therethrough, second spring means biasing said second valve means to its closed position against the flow of fluid, said second spring means being stronger than said first spring means, said first and second valve means including portions which engage when said parts are connected causing said first valve means to open and said second valve means to remain closed due to the difference in strength of said spring means until the application of fluid pressure in said passage forces said second valve means open, and valve means operatively connected to the part adapted to be connected to said supply conduit and for blocking the flow of fluid to said first and second passages and for venting said passage in the part connected to the supply conduits to the atmosphere when in said blocking position, thereby providing for closing of said second valve under the bias of said stiffer spring.

13. A valve mechanism as defined in claim 12 wherein said valve means is a slide valve mechanism including a sleeve member movable from an open to a closed position and having means providing a vent passageway for directing the vented fluid from said chamber to the end of said slide valve adjacent the supply conduit.

14. A valve mechanism as defined in claim 13 wherein said means providing said vent passageway includes baffles on the outer periphery of said sleeve member and fluid passageway means operatively connecting said baffles and said first passage in the part connected to the supply conduit.

15. A valve mechanism for handling high pressure fluids comprising a valve body member having a fluid inlet chamber and a fluid outlet chamber, means defining separate openings in said valve body communicating with said inlet and outlet chambers, a sleeve member having means for communicating said openings and thereby said inlet and outlet chambers and movably supported on said valve body member for movement between a first position communicating said fluid inlet and outlet chambers and a second position blocking the flow of fluid from said inlet chamber to said outlet chamber, one of said members including resilient sealing ring means providing a fluid tight seal between said members, said sealing ring means being completely curved in cross section and having a first convex peripheral surface portion engaging the adjacent surface of the other member and second convex surface portions extending away from said first convex surface portion on opposite sides thereof, support means for said sealing ring means having concave surface portions corresponding to said second diametrically opposite convex surface portions of said sealing ring means and engaging said second and third diametrically opposite portions over substantially the entire area of said second convex surface portions and clamping the sealing ring means therebetween to trap the sealing ring means therebetween.

16. A valve mechanism as defined in claim 15 wherein said resilient sealing ring means being carried by said sleeve member and said first convex peripheral surface portion engaging said valve body and moving over at least one of said openings therein, said support means includes an annular ledge on said sleeve member having a concave recess therein for engaging one of the opposite second surface portions of said sealing ring means and a rigid band member having a concave recess for engaging the other of the opposite second surface portions of the sealing ring means, and clamping means for clamping the rigid band member into engagement with the sealing ring means and holding the sealing ring means tightly in the concave recesses in the annular ledge and the band member.

17. A valve mechanism adapted to connect a first supply high pressure fluid conduit with a second outlet fluid conduit comprising, a plug part adapted to be connected to one of the conduits and having a first fluid passage therethrough and a socket part for receiving said plug part for connection thereto and adapted to be connected to the other of said conduits and having a second fluid passage therethrough communicating with said first passage when said parts are connected, one of said parts including a self-closing valve located in one of said passages and having a closed position when said parts are disconnected and an open position for allowing fluid flow through said passages when said parts are connected, means on the other part for moving said valve to its open position and for maintaining it in its open position when said parts are connected, and a slide valve means forming a portion of the one of said parts adapted to be connected to said supply conduit and having a member movable independently of said valve member and when said parts are connected between an open position directing fluid flow therethrough toward said self-closing valve and a closed position blocking the flow of fluid therethrough.

18. A valve mechanism adapted to connect a first supply high pressure fluid conduit with a second outlet high pressure fluid conduit comprising, a plug part adapted to be connected to one of the conduits and having a first fluid passage therethrough and a socket part for receiving said plug part for connection thereto and adapted to be connected to the other of said conduits and having a second fluid passage therethrough communicating with said first passage when said parts are connected, one of said parts including a self-closing valve member located in one of said passages and having a closed position when said parts are disconnected and an open position for allowing fluid flow through said passages when said parts are connected, said valve member being acted upon by fluid pressure to urge it to its closed position, means on the other part for moving said valve member to its open position and for maintaining it in its open position against said fluid pressure when said parts are connected, and a slide valve means having an inlet and an outlet chamber and forming a portion of said one of said parts and adapted to be connected to said supply conduit and having a slide valve member movable independently of said valve member and when said parts are connected between an open position directing fluid flow between said inlet and outlet chambers to act on said valve member to urge it to its closed position and a closed position blocking the flow of fluid to said outlet chamber thereby blocking the flow of fluid acting on said valve member and including means providing for venting said outlet chamber when said slide valve member is in its closed position.

References Cited by the Examiner

UNITED STATES PATENTS

| | | | |
|---|---|---|---|
| 1,944,739 | 1/1934 | Hunt | 137—625.68 |
| 2,304,390 | 12/1942 | Wolfram | 137—614.03 |
| 2,451,218 | 10/1948 | Hengst | 137—614.04 |
| 2,456,045 | 12/1948 | Brock | 137—614.03 |
| 2,505,410 | 4/1950 | Klass | 137—625.68 |
| 2,509,671 | 5/1950 | Christensen | 251—344 |
| 2,706,646 | 4/1955 | Olson | 137—614.04 |
| 2,735,696 | 2/1956 | Omon | 137—614.05 |
| 2,760,754 | 8/1956 | Gladstone | 251—344 |
| 2,761,469 | 9/1956 | Hansen | 137—614.05 |
| 2,820,654 | 1/1958 | Bolling | 277—188 X |
| 2,854,259 | 9/1958 | Clark | 137—614.03 |

FOREIGN PATENTS 224,101  11/1924  Great Britain.

M. CARY NELSON, *Primary Examiner.*

MARTIN P. SCHWADRON, *Examiner.*